US012729269B2

(12) United States Patent
Iwasawa et al.

(10) Patent No.: US 12,729,269 B2
(45) Date of Patent: Sep. 8, 2026

(54) EPOXY RESIN COMPOSITION

(71) Applicant: THREEBOND CO., LTD., Tokyo (JP)

(72) Inventors: Jyunya Iwasawa, Tokyo (JP); Kouki Mihashi, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 754 days.

(21) Appl. No.: 17/906,294

(22) PCT Filed: Jan. 21, 2021

(86) PCT No.: PCT/JP2021/002001

§ 371 (c)(1),
(2) Date: Sep. 14, 2022

(87) PCT Pub. No.: WO2021/192559

PCT Pub. Date: Sep. 30, 2021

(65) Prior Publication Data

US 2023/0102259 A1 Mar. 30, 2023

(30) Foreign Application Priority Data

Mar. 23, 2020 (JP) ................................ 2020-051805

(51) Int. Cl.
*C08G 59/66* (2006.01)
*C08G 59/50* (2006.01)
*C08G 65/18* (2006.01)

(52) U.S. Cl.
CPC ......... *C08G 59/66* (2013.01); *C08G 59/5046* (2013.01); *C08G 65/18* (2013.01)

(58) Field of Classification Search
CPC .. C08G 59/66; C08G 59/5046; C08G 59/184; C08G 59/18; C08G 59/50; C08G 65/18
USPC .......................................................... 524/107
See application file for complete search history.

(56) References Cited

U.S. PATENT DOCUMENTS

2010/0273940 A1* 10/2010 Urakawa ................ C08G 59/66 560/147
2016/0002510 A1 1/2016 Champagne et al.
2019/0194502 A1 6/2019 Ota et al.
2020/0040131 A1* 2/2020 Fukamoto .............. C09J 133/06
2020/0385513 A1* 12/2020 Zillessen ................ C08G 59/66

FOREIGN PATENT DOCUMENTS

| | | |
|---|---|---|
| JP | 1994-211970 A | 8/1994 |
| JP | H06-211969 A | 8/1994 |
| JP | 2009040989 A | 2/2009 |
| JP | 2012236972 A | 12/2012 |
| JP | 2016514738 A | 5/2016 |
| JP | 6114893 B | 4/2017 |
| JP | 2018-159069 A | 10/2018 |
| JP | 2018172494 A | 11/2018 |
| JP | 2019-019180 A | 2/2019 |
| JP | 2019156965 A | 9/2019 |
| JP | 2020-023601 A | 2/2020 |
| WO | 2018047597 A1 | 3/2018 |
| WO | 2020044964 A1 | 3/2020 |

OTHER PUBLICATIONS

Office Action dated Sep. 21, 2023 for the corresponding Chinese Patent Application No. 202180019447.1, with English translation.
International Search Report for the corresponding Patent Application No. PCT/JP2021/002001 dated Mar. 23, 2021, with English translation.
Chinese Patent Office, "Second Review Opinion Notice" dated Apr. 9, 2024, which was issued for the corresponding Chinese Patent Application No. 202180019447.1, with English translation, 10 pages.
Notice of Reasons for Refusal dated Sep. 10, 2024, issued for the corresponding Japanese Patent Application No. 2022-509319, 13 pages, with English Translation.
Office Action, dated Jul. 18, 2025, which was issued for the corresponding Korean Patent Application No. 10-2022-7032258, 11 pages, with English machine translation.
Office Action, dated Apr. 3, 2026, which was issued for the corresponding Korean Patent Application No. 10-2022-7032258, 7 pages, with English translation.

* cited by examiner

*Primary Examiner* — Ruiyun Zhang
(74) *Attorney, Agent, or Firm* — LUCAS & MERCANTI, LLP

(57) ABSTRACT

An epoxy resin composition comprising the following components (A) to (E). Component (A) is a compound containing two or more epoxy groups. Component (B) is phenyl monoglycidyl ether having an alkyl group with 1 to 10 carbon atoms. Component (C) is an oxetane compound. Component (D) is a thiol curing agent. Component (E) is a curing accelerator.

15 Claims, No Drawings

EPOXY RESIN COMPOSITION

CROSS REFERENCE TO RELATED APPLICATION

This Application is a 371 of PCT/JP2021/002001 filed on Jan. 21, 2021 which, in turn, claimed the priority of Japanese Patent Application No. 2020-051805 filed on Mar. 23, 2020, both applications are incorporated herein by reference.

TECHNICAL FIELD

The present invention relates to a flexible and low curing shrinkage epoxy resin composition.

BACKGROUND ART

Conventionally, an epoxy resin-containing composition has been used in various fields, due to excellent heat resistance and chemical resistance thereof. On the other hand, an epoxy resin can hardly exhibit flexibility due to a rigid skeleton thereof, and accordingly a thiol curing agent having a flexible skeleton may be used in some cases. Use of a thiol curing agent greatly reduces the hardness and glass transition temperature of a cured product and allows a composition having rapid curability to be obtained. Use of a thiol curing agent, therefore, is applicable as curing technique of an epoxy resin to a wide variety of fields (Patent Literature 1).

PATENT LITERATURE

Patent Literature 1

Japanese Patent Laid-Open No. H 06-211969

SUMMARY OF INVENTION

Technical Problem

A conventional epoxy resin composition with use of a thiol curing agent, however, tends to have a large shrinkage in curing due to the flexible skeleton and rapid curability of the thiol curing agent. In the case where such an epoxy resin composition is used for a small component requiring precise fixing or a heat-sensitive component, the component is unfortunately subject to position deviation or distortion in curing. As described above, a conventional epoxy resin composition with use of a thiol curing agent has difficulty in compatibility between flexibility and low curing shrinkage, while maintaining rapid curability.

Means for Solving Problem

The present inventors have made intensive studies to solve the above-described problems. As a result, the present inventors have invented an epoxy resin composition having rapid curability, flexibility and low curing shrinkage.

The subject matter of the present invention is described as follows.

[1] An epoxy resin composition comprising the following components (A) to (E):

component (A): a compound containing two or more epoxy groups component (B): phenyl monoglycidyl ether having an alkyl group with 1 to 10 carbon atoms component (C): an oxetane compound component (D): a thiol curing agent component (E): a curing accelerator.

[2] The epoxy resin composition according to [1], wherein the component (C) is a compound having two or more oxetanyl groups.

[3] The epoxy resin composition according to [1] or [2], wherein the content of the component (C) is 1 to 70 parts by mass relative to 100 parts by mass of the component (A).

[4] The epoxy resin composition according to any one of [1] to [3], wherein the component (E) is an amine adduct latent curing accelerator.

[5] The epoxy resin composition according to any one of [1] to [4], wherein the component (D) is a secondary thiol.

[6] The epoxy resin composition according to any one of [1] to [5], further comprising a storage stabilizer.

[7] The epoxy resin composition according to any one of [1] to [6], wherein the epoxy resin composition has a curing shrinkage rate of 5.3% or less.

[8] The epoxy resin composition according to any one of [1] to [7], wherein the epoxy resin composition has thermosetting properties.

[9] A cured product of the epoxy resin composition according to any one of [1] to [8].

The cured product of the epoxy resin composition according to [9], wherein the cured product has a storage elastic modulus of 1.0 GPa or less at 25° C.

Advantageous Effects of Invention

The epoxy resin composition of the present invention is highly useful due to a low curing shrinkage rate thereof, while maintaining rapid curability and flexibility.

DESCRIPTION OF EMBODIMENTS

Hereinafter, embodiments of the present invention are described. The present invention is not limited to the following embodiments only. In the present specification, unless otherwise specified, operations and measurement of physical properties or the like are performed under conditions at room temperature (20° C. or more and 25° C. or less)/relative humidity of 40% RH or more and 50% RH or less.

The details of the present invention are described as follows. The component (A) used in the present invention is not particularly limited, as long as it is a compound having two or more epoxy groups in a molecule. Examples of the component (A) include a bisphenol A-type epoxy resin, a bisphenol F-type epoxy resin, a bisphenol S-type epoxy resin, a bisphenol AD-type epoxy resin, a naphthalene-type epoxy resin, a biphenyl-type epoxy resin, a phenol novolac-type epoxy resin, a brominated bisphenol A-type epoxy resin, a hydrogenated bisphenol A-type epoxy resin, a glycidylamine-type epoxy resin, a dicyclopentadiene-type epoxy resin, an ortho cresol novolac-type epoxy resin, and an alicyclic epoxy resin, though not limited thereto. One type of these may be used alone, or two or more may be mixed for use. Among the components (A), from the viewpoint of achieving low viscosity, a bisphenol A-type epoxy resin and a bisphenol F-type epoxy resin are preferred, and a bisphenol F-type epoxy resin is more preferred.

From the viewpoint of curability, the epoxy equivalent of the component (A) is preferably 50 g/eq or more and less than 400 g/eq, more preferably 100 g/eq or more and less than 300 g/eq, still more preferably 120 g/eq or more and less than 250 g/eq, particularly preferably 130 g/eq or more and less than 200 g/eq, and most preferably 140 g/eq or more and less than 180 g/eq. From the viewpoint of achieving low viscosity, the viscosity of the component (A) at 25° C. is preferably 0.1 Pas or more and less than 300 Pa·s, more preferably 0.5 Pas or more and less than 250 Pa·s, still more preferably 1 Pas or more and less than 200 Pa·s, and particularly preferably 1 Pas or more and less than 50 Pas.

Examples of commercially available products of the component (A) include jER828, 1001, 806, 807, 152, 604, 630, 871, YX8000, YX8034 and YX4000 (manufactured by Mitsubishi Chemical Corporation); Epiclon 830, EXA-830LVP, EXA-850CRP, EXA-835LV, HP4032D, HP4700 and HP820 (manufactured by DIC Corporation); EP-4100, EP-4100G, EP-4100E, EP-4100TX, EP-4300E, EP-4000, EP-4000G, EP-4000E, EP-4000TX, EP-4005, EP-4400, EP-4520S, EP-4530, EP-4901, EP-4901EP-4080, EP-4085, EP-4088, EP-5100-75X, EP-7001, EP-4080E, EPU-6, EPU-7N, EPU-11F, EPU-15F, EPU-1395, EPU-73B, EPU-17, EPU-17, EPU-17T-6, EPU-80, EPR-1415-1, EPR-2000, EPR-2007, EPR-1630, EP-49-10N, EP-49-10P2, EPR4023 and EPR2007 (manufactured by ADEKA Corporation); Denacol EX-211, EX-212, EX-252, EX-810, EX-810, EX-811, EX-850, EX-851, EX-821, EX-830, EX-832, EX-841, EX-861, EX-920 and EX-931 (manufactured by Nagase Chemtex Corporation); TEPIC, TEPIC-S and TEPIC-VL (manufactured by Nissan Chemical Corporation); SY-35M, SR-NPG and SR-TMP (manufactured by Sakamoto Yakuhin Kogyo Co., Ltd.), though not limited thereto. Each of these may be used alone, or two or more may be mixed for use.

The component (B) used in the present invention is phenyl monoglycidyl ether having an alkyl group with 1 to 10 carbon atoms. The alkyl group with 1 to 10 carbon atoms is directly bonded to a phenyl group. Use of the component (B) in combination with the component (C) allows the curing shrinkage to be suppressed, even having a low viscosity.

The alkyl group with 1 to 10 carbon atoms directly bonded to a phenyl group in the component (B) may be any one of a straight-chain alkyl group and a branched alkyl group. Specific examples of the alkyl group with 1 to 10 carbon atoms are not particularly limited, including a methyl group, an ethyl group, a n-propyl group, an isopropyl group, a n-butyl group, an isobutyl group, a sec-butyl group, a tert-butyl group, a n-pentyl group, an isopentyl group, a neopentyl group, a 2-ethylhexyl group, a n-hexyl group, a n-heptyl group, a n-octyl group, a n-nonyl group, and a n-decyl group. From the viewpoint of compatibility with other components, the alkyl group directly bonded to a phenyl group in the component (B) is preferably a straight-chain alkyl group with 1 to 8 carbon atoms, more preferably a straight-chain alkyl group with 1 to 6 carbon atoms, and still more preferably a straight-chain alkyl group with 1 to 5 carbon atoms.

The alkyl group with 1 to 10 carbon atoms directly bonded to a phenyl group in the component (B) may be in any position of the p (para) position, m (meta) position and o (ortho) position relative to the glycidyl ether group in the phenyl group, and preferably in the p position.

From the viewpoint of the curability and the curing shrinkage, the epoxy equivalent of the component (B) is preferably 100 to 300 g/eq, more preferably 150 to 250 g/eq, still more preferably 160 to 230 g/eq, particularly preferably 180 to 220 g/eq, and most preferably 190 to 215 g/eq. From the viewpoint of the curability and the curing shrinkage, the viscosity of the component (B) at 25° C. is preferably 0.1 mPa·s or more and less than 300 mPa·s, more preferably 0.5 mPa·s or more and less than 250 mPa·s, still more preferably 1 mPa·s or more and less than 200 mPa·s, particularly preferably 1 mPa·s or more and less than 100 mPa·s, and most preferably 5 mPa·s or more and less than 50 mPa·s.

Specific examples of the component (B) include methylphenyl glycidyl ether, ethylphenyl glycidyl ether, propylphenyl glycidyl ether, butylphenyl glycidyl ether, pentylphenyl glycidyl ether, hexylphenyl glycidyl ether, heptylphenyl glycidyl ether, octylphenyl glycidyl ether, nonylphenyl glycidyl ether, and decylphenyl glycidyl ether, and from the viewpoint of compatibility with other components, ones having an alkyl group with 1 to 6 carbon atoms are preferred, 4-tert-butylphenyl glycidyl ether and 4-sec-butylphenyl glycidyl ether are more preferred, and 4-tert-butylphenyl glycidyl ether is most preferred.

Examples of the commercially available product of the component (B) include ED-509E and ED-509S manufactured by ADEKA Corporation and Denacol EX-146 manufactured by Nagase Chemtex Corporation.

The content of the component (B) relative to 100 parts by mass of the component (A) is preferably 1 to 100 parts by mass, more preferably 2 to 90 parts by mass, still more preferably 5 to 80 parts by mass, particularly preferably 10 to 70 parts by mass, and most preferably 15 to 50 parts by mass. With a content of the component (B) of 1 to 100 parts by mass, a flexible and low curing shrinkage epoxy resin composition can be obtained.

The component (C) is not particularly limited as long as it is an oxetane compound, and from the viewpoint of further reducing the curing shrinkage rate, one having two or more oxetanyl groups is preferred. It is presumed that due to containing an oxetane compound, the shrinkage resulting from curing of thiol is suppressed, so that reduction in curing shrinkage rate can be achieved. In a preferred embodiment, the component (C) is an oxetane compound having an aromatic ring.

Specific examples of the component (C) include 3-ethyl-3-hydroxymethyl oxetane, 2-ethylhexyl oxetane, xylene bisoxetane, 3-ethyl-3{[(3-ethyloxetan-3-yl)methoxy]methyl}oxetane, 4,4'-bis[(3-ethyl-3-oxetanyl)methoxymethyl]biphenyl, bis[(3-ethyl-3-oxetanyl)methyl] isophthalate, ((3-ethyl-3-oxetanyl)methoxymethyl (meth)acrylate, 3-ethyl-3-(4-hydroxybutyloxymethyl) oxetane, and (3-ethyloxetan-3-yl)methyl acrylate, and from the viewpoint of further reducing the curing shrinkage, 3-ethyl-3{[(3-ethyloxetan-3-yl)methoxy]methyl}oxetane and 4,4T-bis[(3-ethyl-3-oxetanyl)methoxymethyl]biphenyl are preferred.

The viscosity of the component (C) is preferably 0.1 mPa·s or more and less than 100 mPa·s, more preferably 0.5 mPa·s or more and less than 80 mPa·s, still more preferably 1 mPa·s or more and less than 50 mPa·s, particularly preferably 5 mPa·s or more and less than 45 mPa·s, and most preferably 15 mPa·s or more and less than 40 mPa·s. In an embodiment, the viscosity of the component (C) is 15 mPa·s or more and less than 40 mPa·s. With a viscosity of the component (C) of 0.1 mPa·s or more and less than 100 mPa·s, the compatibility with other components is good, so that the reduction in curability of the epoxy resin composition can be suppressed.

Examples of commercially available products of the composition (C) include Aron oxetane OXT-101, OXT-212, OXT-121 and OXT-221 manufactured by Toagosei Co., Ltd., Eternacoll EHO, OXMA, OXBP, HBOX and OXIPA manufactured by UBE Corporation, and OXE-10 and OXE-30 manufactured by Osaka Organic Chemical Industry Ltd.

The content of the component (C) relative to 100 parts by mass of the component (A) is preferably 1 to 70 parts by mass, more preferably 3 to 60 parts by mass, still more preferably 5 to 50 parts by mass, particularly preferably 6 to 40 parts by mass, and most preferably 7 to 30 parts by mass. With a content of the component (C) of 1 to 70 parts by mass, sufficiently low curing shrinkage is achieved, while maintaining the curability as epoxy resin composition.

The component (D) is a thiol curing agent. The thiol curing agent is not particularly limited as long as it has an SH group, and from the viewpoint of curability, a compound having two or more SH groups is preferred, a compound having three or more SH groups is more preferred, and a compound having four or more SH groups is most preferred. From the viewpoint of further reducing the curing shrinkage, a secondary thiol is preferred.

The secondary thiol is a thiol compound in which the carbon bonding to a sulfur atom (carbon bonding to a mercapto group) is a secondary carbon atom.

Specific examples of the component (D) include trimethylolpropane tris(3-mercaptopropionate), tris-[(3-mercaptopropionyloxy)-ethyl]-isocyanurate, pentaerythritol tetrakis (3-mercaptopropionate), tetraethylene glycol bis(3-mercaptopropionate), dipentaerythritol hexakis(3-mercaptoproionate), pentaerythritol tetrakis(3-mercaptobutylate), 1,4-bis(3-mercaptobutyryloxy)butane, 1,3,5-tris(3-mercaptobutyriloxyethyl)-1,3,5-triazine-2,4,6-(1H,3H,5H)-trione, trimethylolpropane tris(3-mercaptobutylate), trimethylolethane tris(3-mercaptobutylate), trimethylolpropane tris(3-mercaptobutylate), and trimethylolethane tris(3-mercaptobutylate), though not limited thereto.

Examples of the commercially available product of the component (D) include TMMP, TEMPIC, PEMP, EGMP-4 and DPMP manufactured by SC Organic Chemical Co., Ltd., Karenz MTPE1, BD1, NR1 and TPMB manufactured by Showa Denko K.K., though not limited thereto.

The content of the component (D) relative to 100 parts by mass of the component (A) is preferably 10 to 350 parts by mass, more preferably 50 to 300 parts by mass, still more preferably 70 to 200 parts by mass, particularly preferably 100 to 170 parts by mass, and most preferably 110 to 150 parts by mass. With a content of the component (D) of 10 to 350 parts by mass (more preferably 50 to 300 parts by mass), a flexible epoxy resin composition excellent in curability can be obtained.

From the viewpoint of the curability and the curing shrinkage, the epoxy equivalent of the component (D) is preferably 10 to 300 g/eq, more preferably 50 to 250 g/eq, still more preferably 80 to 230 g/eq, and particularly preferably 100 to 200 g/eq.

The functional group equivalent ratio between the component (A) and the component (D), i.e. (A)/(D), is preferably 0.3 to 2.0, more preferably 0.3 to 1.5, still more preferably 0.4 to 1.0, particularly preferably 0.4 to 0.9, and most preferably 0.4 to 0.8. With a functional group equivalent ratio between the component (A) and the component (D), i.e. (A)/(D), of 0.3 to 2.0, no reduction in curability occurs. Incidentally, the functional group equivalent ratio between the component (A) and the component (D), i.e. (A)/(D), is calculated in consideration of the amounts of the component (A) and the component (D) compounded. In other words, "Functional group equivalent A1 in compounding of the component (A)" is a value calculated from "Amount of component (A) compounded/Thiol equivalent (g/eq)"; "Functional group equivalent D1 in compounding of the component (D)" is a value calculated from "Amount of component (D) compounded/Mercapto equivalent (g/eq)"; and the functional group equivalent ratio between the component (A) and the component (D), i.e. (A)/(D), is calculated from "Functional group equivalent A1 in compounding of component (A)/Functional group equivalent D1 in compounding of component (D)".

The component (E) is a compound having thermosetting properties, and not particularly limited as long as it accelerates curing of the component (D). From the viewpoint of rapid curability and storage stability, the component (E) is preferably a solid at 25° C., and use of pulverized fine powder of a compound of having an imidazole skeleton or an epoxy adduct compound obtained from a suspended reaction of adding a tertiary amine to an epoxy resin is preferred. In particular, from the viewpoint of low temperature curability and low curing shrinkage, an amine adduct latent curing accelerator is preferred, and a modified aliphatic polyamine adduct is more preferred.

Examples of the commercially available product of the curing accelerator include Amicure PN-23, PN-23J, PN-31, PN-31J, PN-40J, PN-H, PN-R, MY-24 and MY-R manufactured by Ajinomoto Fine-Techno Co., Inc., Fujicure FXE-1000, Fujicure FXR-1030 and Fujicure FXR-1081 manufactured by T&K TOKA CO., LTD., Curezol SIZ, 2MZ-H, C11Z, C17Z, 2PZ, 2PZ-PW and 2P4MZ manufactured by Shikoku Chemicals Corporation.

From the curability and storage stability, the softening point of the component (E) is preferably in the range of 70 to 300° C., more preferably 80 to 250° C., still more preferably 90 to 200° C., particularly preferably 95 to 150° C., and most preferably 100 to 130° C. In an embodiment, the softening point of the component (E) may be 100 to 200° C., or 90 to 130° C.

The average particle size of the component (E) is preferably 0.1 to 50 μm, more preferably 0.5 to 40 μm, still more preferably 1 to 30 μm, particularly preferably 2 to 20 μm, and most preferably 2.5 to 10 μm. With an average particle size of 0.1 to 50 μm, an epoxy resin composition excellent in dispersibility in mixing of the component (A) and the component (B), having a stable curability, can be prepared. Incidentally, examples of the determination method of the average particle size include use of a particle size/shape distribution analyzer by laser diffraction scattering or by micro sorting control, and image analysis of an optical microscope, electron microscope, etc.

The content of the component (E) relative to 100 parts by mass of the component (D) is preferably 0.001 to 20 parts by mass, and most preferably 0.01 to 10 parts by mass. With a content of 0.001 to 10 parts by mass, stable curability can be maintained without reduction in storage stability.

Further, an appropriate amount of additives such as an inorganic filler, an organic filler, a pigment, a dye, a silane coupling agent, a levelling agent, a rheology controller, and a storage stabilizer may be further contained in the range where the characteristics of the present invention are not impaired.

Examples of the inorganic filler include aluminum powder, calcium carbonate powder, talc powder, silica powder, fumed silica powder, powder of metal such as gold, silver, copper, nickel and palladium, alloy such as solder made of a combination of a plurality of these metal powder, plated particles such as organic polymer particles or metal particles coated with thin film of another metal, carbon powder, and tungsten powder, though not limited thereto. The suitable range of the amount of the inorganic filler compounded relative to 100 parts by mass of the component (A) is preferably 1 to 500 parts by mass, more preferably 3 to 100 parts by mass, and most preferably 5 to 30 parts by mass.

The organic filler may be organic powder made of rubber, elastomer, plastic, polymer (or copolymer), or the like. Alternatively, the organic filler may have a multi-layer structure such as a core-shell type. It is preferable that the average particle size be in the range of 0.05 to 50 μm. From the viewpoint of improving properties in a durability test, it is preferable that a filler made of polymer or copolymer of acrylic acid ester and/or (meth)acrylic acid ester, or a filler made of polymer or copolymer made of styrene compound be contained. The suitable amount of organic filler compounded relative to 100 parts by mass of (A) is preferably 1 to 50 parts by mass, more preferably 5 to 30 parts by mass.

Examples of the silane coupling agent include a glycidyl group-containing silane coupling agent such as 3-acryloxypropyl trimethoxysilane, 3-glycidoxypropyl methyldimethoxysilane, 3-glycidoxypropyl methyldiethoxysilane, 3-glycidoxypropyl methyldipropyloxysilane, 3-glycidoxypropyl dimethylmonomethoxysilane, 3-glycidoxypropyl dimethylmonoethoxysilane, 3-glycidoxypropyl dimethylmonopropyloxysilane, 2-(3,4-epoxycyclohexyl)ethyltrimethoxysilane, 3-glycidoxypropyl triethoxysilane, 3-glycidoxypropyl trimethoxysilane, and 3-glycidoxypropyl methyldiethoxysilane; a vinyl group-containing silane coupling agent such as vinyltris(β-methoxyethoxy)silane, vinyltriethoxysilane, and vinyltrimethoxysilane; a (meth)acrylic group-containing silane coupling agent such as 3-methacryloxypropyl methyldimethoxysilane, 3-methacryloxypropyl methyldiethoxysilane, 3-methacryloxypropyl dimethylmonomethoxysilane, 3-methacryloxypropyl dimethylmonoethoxysilane, 3-acryloxypropyl methyldipropyloxysilane, 3-acryloxypropyl methyldimethoxysilane, 3-acryloxypropyl methyldiethoxysilane, 3-acryloxypropyl methyldipropyloxysilane, 3-acryloxypropyl dimethylmonopropyloxysilane, 3-acryloxypropyl dimethylmonomethoxysilane, 3-acryloxypropyl dimethylmonoethoxysilane, 3-acryloxypropyl dimethylmonopropyloxysilane, and γ-methacryloxypropyl trimethoxysilane; an amino group-containing silane coupling agent such as N-β-(aminoethyl)-γ-aminopropyltrimethoxysilane, γ-aminopropyltriethoxysilane, and N-phenyl-γ-aminopropyltrimethoxysilane;
γ-mercaptopropyltrimethoxysilane, and γ-chloropropyltrimethoxysilane. Among these, a glycidyl group-containing silane coupling agent is more preferred from the viewpoint of excellent adhesive strength. These may be used alone, or two or more may be used in combination. The suitable range of the amount of the silane coupling agent compounded is 0.1 to 20 parts by mass relative to 100 parts by mass of the component (A) of the present invention.

As the storage stabilizer, a boric acid ester, phosphoric acid, an alkyl phosphoric acid ester, and p-toluene sulphonic acid may be used. Examples of the boric acid ester include tributyl borate, trimethoxyboroxine, and ethyl borate, though not limited thereto. As the alkyl boric acid ester, trimethyl phosphate and tributyl phosphate may be used, though not limited thereto. The storage stabilizers may be used alone, or a plurality thereof may be mixed for use. In consideration of the effect on the curing shrinkage, one or more selected from the group consisting of phosphoric acid, an alkyl phosphoric acid ester, a boric acid ester, trimethoxyboroxine, and methyl p-toluene sulphonate are preferred, and phosphoric acid and a boric acid ester are most preferred. From the viewpoint of maintaining the curability and curing shrinkage, the suitable amount of the storage stabilizer compounded is 0.1 to 10 parts by mass relative to 100 parts by mass of the component (A).

<Coating Method>

As the method for applying the epoxy resin composition of the present invention to an adherend, a known method for applying a sealing agent or an adhesive may be used. For example, methods such as dispensing with use of an automatic applicator, spraying, ink jetting, screen printing, gravure printing, dipping and spin coating may be used. From the viewpoint of coating properties, the viscosity (25° C.) of the composition of the present invention is preferably 10 Pas or less, more preferably 5 Pas or less, still more preferably 1 Pas or less, furthermore preferably 850 mPa·s or less, particularly preferably 750 mPa·s or less, and most preferably 600 mPa·s or less. The practically preferable lower limit of the viscosity (25° C.) of the composition of the present invention is 10 mPa·s or more, though not particularly limited. Due to containing the components (A) to (E), the epoxy resin composition of the present invention having low viscosity in the range can be obtained.

<Curing Method and Cured Product>

The epoxy resin composition of the present invention can be cured by heating. For example, a temperature of 50° C. or more and less than 200° C. is preferred, and a temperature of 60° C. or more and less than 150° C. is more preferred. The curing time is not particularly limited, and in the case where the temperature is 50° C. or more and less than 200° C., a curing time of 1 minute or more and less than 3 hours is preferred, and a curing time of 2 minutes or more and less than 2 hours is more preferred.

The epoxy resin composition of the present invention has a curing shrinkage rate measured by the method described in the following Examples of preferably 5.3% or less, more preferably less than 5.3%, still more preferably less than 5.2%, and particularly preferably less than 5.0%. The cured product of the epoxy resin composition of the present invention has a storage elastic modulus measured by the method described in the following Examples of preferably 1.0 GPa or less, more preferably less than 1.0 GPa, still more preferably less than 0.5 GPa, and particularly preferably less than 0.3 GPa. In other words, the epoxy resin composition of the present invention is an epoxy resin composition from which a cured product having a storage elastic modulus at 25° C. of 1.0 GPa or less can be obtained.

<Application>

The epoxy resin composition of the present invention may be used in various applications. Specific examples of the use include adhesion, sealing, casting, and coating of automobile parts such as switches, head lumps, engine components, electrical components, driving engines, brake oil tanks, front hoods, fenders, body panels such as doors, and windows; in an electronic material field, adhesion, sealing, casting, and coating of flat panel displays (liquid crystal displays, organic EL displays, light emitting diode display devices, and field emission displays), video disks, CD, DVD, MD, pickup lenses and hard disks; in a field of batteries, adhesion, sealing, and coating of lithium batteries, lithium ion batteries, manganese batteries, alkaline batteries, fuel batteries, silicon-based solar batteries, dye-sensitized batteries, and organic solar batteries; in an optical component field, adhesion, sealing, and coating of optical switch peripheries, optical fiber materials of optical connector peripheries, optical passive components, optical circuit components, and optoelectronic integrated circuit peripheries; in an optical equipment field, adhesion, sealing, and coating of camera modules, lens materials, finder prisms, target prisms, finder covers, photo detectors, photographing lenses, and projection lenses of projection televisions; and in an infrastructure field, adhesion of gas pipes and water pipes, lining materials, sealing, and coating materials. Among these, due to the excellent flexibility and low curing shrinkage, the epoxy resin composition of the present invention is suitable for use requiring flexibility, and for use to micro components which tend to cause distortion.

EXAMPLES

Hereinafter, the present invention is described in more detail with reference to Examples, though the present invention is not limited to the following Examples only.

Examples 1 to 4, and Comparative Examples 1 to 8

In order to prepare the compositions, the following components were provided.

(A): epoxy resin including mixture of bisphenols A-type and F-type, trade name: EPICLON EXA-835LV (manufactured by DIC Corporation), epoxy equivalent: 165 g/eq, viscosity (25° C.): 2000 mPa·s (B): p-tert-butylphenyl glycidyl ether, trade name: ADEKA Glycirol ED-509S, epoxy equivalent: 206 g/eq, viscosity (25° C.): 20 mPa·s (B'-1): alkyl(C12-C13) monoglycidyl ether, trade name: ADEKA Glycirol ED-502 (manufactured by ADEKA Corporation), epoxy equivalent: 320 g/eq, viscosity (25° C.): 10 mPa·s (B'-2): 3-pentadecadienylphenyl glycidyl ether, trade name: Epogosey CO (manufactured by Yokkaichi Chemical Co., Ltd.), epoxy equivalent: 450 g/eq, viscosity (25° C.): 45 mPa·s (C-1): 3-ethyl-3[{(3-ethyloxetan-3-yl)methoxy}methyl]oxetane, trade name: Aronoxetane OXT-221 (manufactured by Toagosei Co., Ltd.), viscosity: 10 mPa·s (C-2): 4,4'-bis[(3-ethyl-3-oxetanyl)methoxymethyl]biphenyl, trade name: Eternacoll OXBP (manufactured by UBE Corporation), viscosity (25° C.): 300 mPa·s (C-3): 3-ethyl-3-(4-hydroxybutyloxymethyl)oxetane, trade name: HBOX (manufactured by UBE Corporation), viscosity (25° C.): 30 mPa·s (C-4): (3-ethyl-3-oxetanyl)methoxymethyl methacrylate, trade name: Eternacoll OXMA (manufactured by UBE Corporation), viscosity (25° C.): 4 mPa·s (C'-1): neopentyl glycol diglycidyl ether, trade name: ADEKA Glycirol ED-523L (manufactured by ADEKA Corporation), epoxy equivalent: 140 g/eq, viscosity (25° C.): 15 mPa·s (C'-2): 1,4-hexanedimethanol diglycidyl ether, trade name: ADEKA Resin EP-4085S (manufactured by ADEKA Corporation), epoxy equivalent: 145 g/eq, viscosity (25° C.): 50 mPa·s (C'-3): dicyclopentadiene-type epoxy resin, trade name: ADEKA Resin EP-4088S (manufactured by ADEKA Corporation), epoxy equivalent: 170 g/eq, viscosity (25° C.): 230 mPa·s (C'-4): 1,6-hexanediol diglycidyl ether, trade name: ADEKA Glycirol ED-503G (manufactured by ADEKA Corporation), epoxy equivalent: 135 g/eq, viscosity (25° C.): 15 mPa·s (D): pentaerythritol tetrakis(3-mercaptobutylate), trade name: Karenz MTPE1 (manufactured by Showa Denko K.K.), SH equivalent: 136 g/eq (E): modified aliphatic polyamine adduct, product name: Fujicure FXR-1081, amine value: 115, softening point: 125° C., average particle size: 6.0 μm Other Component: Boric Acid Ester (Reagent)

The component (A) and the component (B) were weighed in an agitated vessel, and the component (C) was added thereto and stirred for 30 minutes. Further, the component (D) and the component (E) were added thereto and stirred for 10 minutes. The detailed amounts prepared are according to Table 1 and Table 2, and all the values are expressed in terms of parts by mass. All the tests were performed at 25° C.

[Curing Shrinkage Rate]

Into a transparent cylindrical plastic container, the composition was dropped to have a thickness of 6 mm. The composition was cured under conditions at 80° C. for 60 minutes in a hot air dryer, and the resulting cured product was measured. The specific gravity (Sg1) of the uncured composition was measured by a specific gravity cup method. Further, the weight of the cured product in air (WA) and the weight of the cured product in water (distilled water) (WB) were measured to obtain the specific gravity of the cured product (Sg2) based on a calculation formula: $Sg2=WA/(WA-Wb)$. Further, the curing shrinkage rate was obtained as follows. From the specific gravity of the uncured composition (Sg1) and the specific gravity of the cured product (Sg2), the curing shrinkage rate (ΔV) was calculated based on a calculation formula: $\Delta V=(Sg2-Sg1)/Sg2\times 100$.

<Acceptance Criteria> Curing Shrinkage Rate of Less than 5.3%, More Preferably Less than 5.0%

[Measurement of DMA (Storage Elastic Modulus)]

The composition was poured into a jig to make a thickness of the composition of 1 mm, and then defoamed. The composition was then cured at 80° C. for 60 minutes to make a cured product. The cured product was cut into a strip having a width of 10 mm as a test piece. The test piece was installed on a dynamic mechanical analyzer (DMS6100 manufactured by Seiko Instruments Inc.) to measure the storage elastic modulus at 25° C. (1 Hz, temperature rising rate: 3° C./sec).

<Acceptance Criteria> Storage Elastic Modulus of 1.0 GPa or Less

TABLE 1

| | | Example 1 | Example 2 | Example 3 | Example 4 | Comparative Example 1 | Comparative Example 2 |
|---|---|---|---|---|---|---|---|
| A | EX-835LV | 100 | 100 | 100 | 100 | 100 | 100 |
| B | ED-509S | 41.7 | 41.7 | 41.7 | 41.7 | | |
| B'-1 | ED-502 | | | | | 41.7 | |
| B'-2 | Epogosey CO | | | | | | 41.7 |
| C-1 | OXT-221 | 13.9 | | | | 13.9 | 13.9 |
| C-2 | OXBP | | 13.9 | | | | |
| C-3 | HBOX | | | 13.9 | | | |
| C-4 | OXMA | | | | 13.9 | | |
| C'-1 | ED-523L | | | | | | |

TABLE 1-continued

| | | Example 1 | Example 2 | Example 3 | Example 4 | Comparative Example 1 | Comparative Example 2 |
|---|---|---|---|---|---|---|---|
| C'-2 | EP-4085S | | | | | | |
| C'-3 | EP-4088S | | | | | | |
| C'-4 | ED-503G | | | | | | |
| D | MT PE1 | 138.9 | 138.9 | 138.9 | 138.9 | 138.9 | 138.9 |
| E | FXR1081 | 8.3 | 8.3 | 8.3 | 8.3 | 8.3 | 8.3 |
| Other Component | Boric acid ester | 0.8 | 0.8 | 0.8 | 0.8 | 0.8 | 0.8 |
| Total amount compounded | | 304 | 304 | 304 | 304 | 304 | 304 |
| Curing shrinkage rate | % | 4.72 | 4.38 | 4.71 | 5.24 | 4.43 | 3.95 |
| Storage elastic modulus | GPa | 0.1 | 0.03 | 0.03 | 0.17 | 1600 | 2700 |

TABLE 2

| | | Comparative Example 3 | Comparative Example 4 | Comparative Example 5 | Comparative Example 6 | Comparative Example 7 |
|---|---|---|---|---|---|---|
| A | EX-835LV | 100 | 100 | 100 | 100 | 100 |
| B | ED-509S | 41.7 | 41.7 | 41.7 | 41.7 | 41.7 |
| B'-1 | ED-502 | | | | | |
| B'-2 | Epogosey CO | | | | | |
| C-1 | OXT-221 | | | | | |
| C-2 | OXBP | | | | | |
| C-3 | HBOX | | | | | |
| C-4 | OXMA | | | | | |
| C'-1 | ED-523L | | 13.9 | | | |
| C'-2 | EP-4085S | | | 13.9 | | |
| C'-3 | EP-4088S | | | | 13.9 | |
| C'-4 | ED-503G | | | | | 13.9 |
| D | MT PE1 | 138.9 | 138.9 | 138.9 | 138.9 | 138.9 |
| E | FXR1081 | 8.3 | 8.3 | 8.3 | 8.3 | 8.3 |
| Other component | Boric acid ester | 0.8 | 0.8 | 0.8 | 0.8 | 0.8 |
| Total amount compounded | | 290 | 304 | 304 | 304 | 304 |
| Curing shrinkage rate | % | 5.66 | 5.45 | 5.32 | 5.35 | 5.10 |
| Storage elastic modulus | GPa | 2.5 | 3.0 | 1.8 | 2.1 | 1.2 |

As shown in Table 1, it is indicated that in Examples 1 to 4, even though the storage elastic modulus is greatly lower than those in Comparative Examples, the curing shrinkage rate is low and the flexibility and low curing shrinkage are excellent. In Comparative Examples 1 and 2, where a reactive diluent having a structure different from the component (B) was used, the resulting storage elastic modulus was very high. In any of Comparative Examples 3 to 7, where no component (C) was contained, the resulting curing shrinkage rate and storage elastic modulus were higher than those in Examples 1 to 4. From the above, it is indicated that containing the components (A) to (E) allows the compatibility between the low storage elastic modulus (flexibility) and the low curing shrinkage to be achieved. Incidentally, the viscosity (25° C.) of the composition in Example 1 measured at a shear velocity of 10 $s^{-1}$ with a cone-plate type viscometer was 500 mPa·s. Further, through measurement of the viscosity (25° C.) of the compositions in Examples 2 to 4 at a shear velocity of 10 $s^{-1}$ with a cone-plate type viscometer, the following was confirmed: the composition in Example 2: 522 mPa·s, the composition in Example 3: 412 mPa·s, and the composition in Example 4: 581 mPa·s.

The present application is based on Japanese Patent Application No. 2020-051805 filed on Mar. 23, 2020, and the entire disclosure thereof is incorporated in the present specification by reference.

INDUSTRIAL APPLICABILITY

The epoxy resin composition of the present invention has flexibility and low curing shrinkage, so that the composition is useful as an adhesive, coating material and potting material used for components subject to position deviation or external stress in various fields.

The invention claimed is:

1. An epoxy resin composition comprising the following components (A) to (E):
   - component (A): a compound containing two or more epoxy groups
   - component (B): phenyl monoglycidyl ether having an alkyl group with 1 to 10 carbon atoms
   - component (C): an oxetane compound
   - component (D): a secondary thiol curing agent
   - component (E): a curing accelerator,
   - wherein the epoxy resin composition further comprises one or more storage stabilizers selected from the group consisting of a boric acid ester, a phosphoric acid, and p-toluene sulphonic acid,
   - the content of the component (B) is 1 to 100 parts by mass, the content of the component (C) is 7 to 30 parts by mass, and the content of the component (D) is 110 to 150 parts by mass, relative to 100 parts by mass of the component (A), a viscosity (25° C.) of the epoxy resin composition is 750 mPa·s or less, and a curing shrinkage rate of the epoxy resin composition is less than 5.3%.

2. The epoxy resin composition according to claim 1, wherein the component (C) is a compound having two or more oxetanyl groups.

3. The epoxy resin composition according to claim 1, wherein the component (E) is an amine adduct latent curing accelerator.

4. The epoxy resin composition according to claim 1, wherein the epoxy resin composition has thermosetting properties.

5. A cured product of the epoxy resin composition according to claim 1.

6. The cured product of the epoxy resin composition according to claim 5, wherein the cured product has a storage elastic modulus of 1.0 GPa or less at 25° C.

7. An epoxy resin composition comprising the following components (A) to (E):

component (A): a compound containing two or more epoxy groups component (B): phenyl monoglycidyl ether having an alkyl group with 1 to 10 carbon atoms component (C): an oxetane compound component (D): a secondary thiol curing agent component (E): a curing accelerator, wherein the epoxy resin composition does not comprise an elastomer, the content of the component (B) is 1 to 100 parts by mass, the content of the component (C) is 7 to 30 parts by mass, and the content of the component (D) is 110 to 150 parts by mass, relative to 100 parts by mass of the component (A), a viscosity (25° C.) of the epoxy resin composition is 750 mPa·s or less, and a curing shrinkage rate of the epoxy resin composition is less than 5.3%.

8. The epoxy resin composition according to claim 1, wherein the content of the component (B) is 5 to 80 relative to 100 parts by mass of the component (A).

9. The epoxy resin composition according to claim 7, wherein the content of the component (B) is 5 to 80 (C) relative to 100 parts by mass of the component (A).

10. The epoxy resin composition according to claim 1, wherein the content of the component (E) is 0.01 to 10 parts by mass relative to 100 parts by mass of the component (D).

11. The epoxy: resin composition according to claim 7, wherein the content of the component (E) is 0.01 to 10 parts by mass relative to 100 parts by mass of the component (D).

12. The epoxy resin composition according to claim 7, further comprising one or more storage stabilizers selected from the group consisting of a boric acid ester, a phosphoric acid, and p-toluene sulphonic acid.

13. An epoxy resin composition consisting of the following components (A) to (E) and optionally at least one additive:

component (A): a compound containing two or more epoxy groups component (B): phenyl monoglycidyl ether having an alkyl group with 1 to 10 carbon atoms component (C): an oxetane compound component (D): a secondary thiol curing agent component (E): a curing accelerator, wherein the epoxy resin composition further comprises one or more storage stabilizers selected from the group consisting of a boric acid ester, a phosphoric acid, and p-toluene sulphonic acid, the content of the component (B) is 1 to 100 parts by mass, the content of the component (C) is 7 to 30 parts by mass, and the content of the component (D) is 110 to 150 parts by mass relative to 100 parts by mass of the component (A), the at least one additive is selected from the group consisting of an inorganic filler, an organic filler, a pigment, a dye, a silane coupling agent, a levelling agent, a rheology controller, and a storage stabilizer, a viscosity (25° C.) of the epoxy resin composition is 750 mPa·s or less, and a curing shrinkage rate of the epoxy resin composition is less than 5.3%.

14. The epoxy resin composition according to claim 1, wherein the component (D) comprises one or more storage stabilizers selected from the group consisting of pentaerythritol tetrakis(3-mercaptobutyrate), 1,4-bis(3-mercaptobutyryloxy) butane, 1,3,5-tris(3-mercaptobutyryloxyethyl)-1,3,5-triazine-2,4,6 (1H, 3H, 5H)-trione, trimethylolpropane tris(3-mercaptobutyrate), and trimethylolethane tris(3-mercaptobutyrate).

15. The epoxy resin composition according to claim 7, wherein the component (D) comprises one or more storage stabilizers selected from the group consisting of pentaerythritol tetrakis(3-mercaptobutyrate), 1,4-bis(3-mercaptobutyryloxy) butane, 1,3,5-tris(3-mercaptobutyryloxyethyl)-1,3,5-triazine-2,4,6 (1H, 3H, 5H)-trione, trimethylolpropane tris(3-mercaptobutyrate), and trimethylolethane tris(3-mercaptobutyrate).

* * * * *